June 1, 1965 A. W. DAHLBERG 3,187,322
BINARY SIGNAL CONVERTER
Filed Aug. 13, 1961
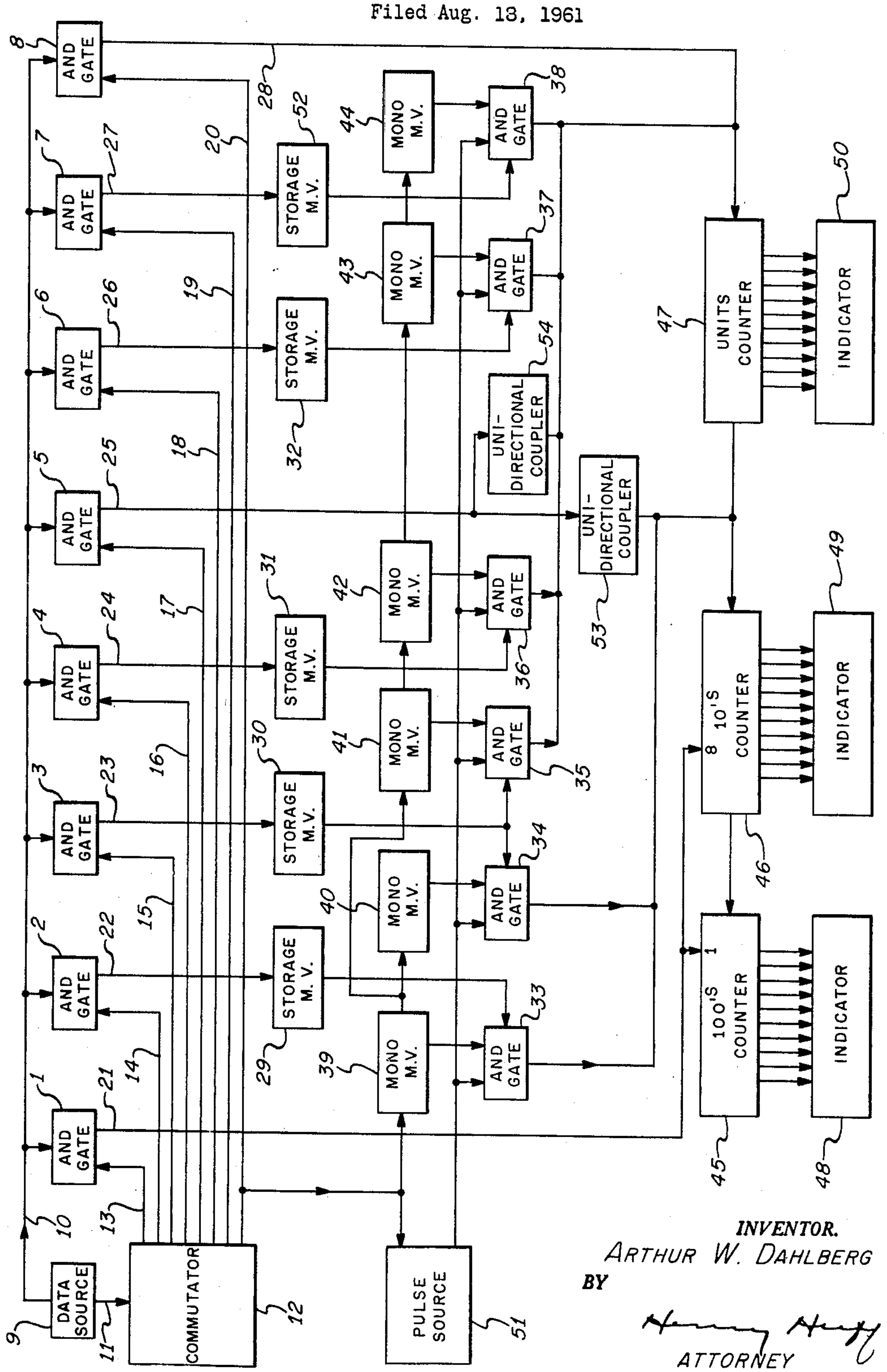
INVENTOR.
ARTHUR W. DAHLBERG
BY
[signature]
ATTORNEY

United States Patent Office 3,187,322
Patented June 1, 1965

3,187,322
BINARY SIGNAL CONVERTER

Arthur W. Dahlberg, Binghamton, N.Y., assignor to Sperry Rand Corporation, Great Neck, N.Y., a corporation of Delaware Filed Aug. 18, 1961, Ser. No. 132,320
7 Claims. (Cl. 340—347)

The present invention generally relates to data converters and, more particularly, to apparatus for converting the value of a quantity represented by binary signals into a proportional value represented by other digital signals.

There is frequently a need for converting a numerical expression in a particular number system to a corresponding expression in another number system. For example, it is sometimes desirable to transform the value of a number represented by binary signals into a display representing the decimal equivalent thereof. Often, the value of the number is preserved in the transformation process. Occasions arise, however, wherein it becomes necessary not only to convert the radix of the digital representation but also to introduce a scale factor in the conversion. In a typical case, it may be required to convert an eight bit binary digital representation of quantities in the range from zero to 255 inclusive into a three bit decimal representation having values in the range from zero to 359 inclusive. That is, each of the original values is multiplied by a scale factor of approximately 1.41 in the process of converting the binary representation to the desired decimal representation.

It is the principal object of the present invention to provide digital apparatus for converting the value of a binary numerical expression into a proportionally valued numerical expression of a different radix.

A further object of the present invention is to provide digital means for converting a binary numerical expression into a decimal numerical expression.

Another object of the present invention is to provide a simplified binary digital converter wherein the ratio between the values of the input numerical expressions to the values of the output numerical expressions is readily controllable.

These and other objects of the present invention, as will appear from a reading of the following specification, are accomplished by the provision of apparatus adapted to respond to pulsed data signals, each signal representing the unity value "one" of a respective digit of a binary numerical expression. The apparatus includes a plurality of data storage devices connected to receive respective ones of the data signals and operative to produce output signals in response thereto. Also provided are a source of clock pulses and a plurality of multiple input coincidence gates. Each coincidence gate is coupled to receive the clock pulses and is conditioned for conduction by the output signal produced by a respective one of the storage devices.

The coincidence gates are further conditioned for conduction by a succession of gating pulses, each gating pulse having a predetermined duration proportional to the desired weighting value of a respective digit of the binary numerical representation. Thus, each of the multiple input coincidence gates receiving an output pulse from an associated storage device is rendered conductive by a respective gating pulse for a length of time sufficient to pass a predetermined number of the clock pulses proportional to the desired weighting value of a respective digit of the binary numerical representation. In a representative embodiment of the invention, the pulses passed by the coincidence gates are applied to a decimal counter to produce a decimal indication of the value of the binary number represented by the input pulsed data signals. As desired, the absolute magnitude of the binary number may be preserved in the decimal indication. Alternatively, the decimal counter may indicate a value bearing a predetermined ratio to the value of the binary number. Said ratio may be varied by adjusting the duration of each gating pulse in the same predetermined manner relative to the repetition interval of the clock pulses.

For a more complete understanding of the present invention, reference should be had to the following specification and to the sole figure which is a simplified block diagram of an illustrative embodiment. Referring to the figure, data source 9 produces a sequence of pulses on line 10, each pulse representing the value "one" of a respective digit of a binary number. The absence of a pulse denotes the value "zero" for the digit associated therewith. The pulse representing the most significant digit occurs first. The pulses appearing on line 10 are applied jointly to first inputs of double coincidence gates 1–8, inclusive.

Data source 9 also produces on line 11 a series of timing signals occurring synchronously with the binary data pulses of line 10. The timing pulses are applied to the input of a conventional commutator 12 which, in turn, causes the sequential energization of output lines 13–20, inclusive. Line 13 is energized concurrently with the appearance of a pulse, if any, representing the value "one" of the most significant digit of the binary number. Line 14 is energized concurrently with the pulse, if any, representing the second most significant digit, and so on. Line 20 is energized concurrently with the occurrence of a pulse, if any, representing the least significant digit of the binary number represented by the pulses appearing on line 10.

Eight double coincidence AND gates are indicated by way of example in the illustrative embodiment of the sole figure. Each gate is associated exclusively with a respective digit of an eight bit binary number represented by the pulses of line 10 and is rendered conductive synchronously therewith. Thus, the apparatus so far described produces on each of the output lines 21–28 inclusive a single pulse when the value of the associated digit of the input binary number is unity. No pulse is produced on a given output line when the value of the associated digit is zero.

It will be noted that the apparatus of the sole figure is equipped to handle an eight bit binary number having a total of 256 distinguishable values. As will be seen more fully later, the present invention is adapted not only for the conversion of the input binary number representation to a corresponding non-binary representation, but also is operative to introduce a scale factor into the conversion whereby an output indication having, for example, a total of 360 distinguishable values is produced in response to the input binary representation having a total of 256 distinguishable values.

The conversion of the binary representation is facilitated by the provision of bistable storage elements for certain of the pulsed binary signals passed by coincidence gates 1–8. In particular, such provision is made for the pulses passed by gates 2, 3, 4, 6 and 7. Accordingly, bistable storage multivibrators 29, 30, 31, 32 and 52 are connected to the output of gates 2, 3, 4, 6 and 7 respectively. If a pulse is passed (indicating the value "one" of a respective digit) by any of the gates 2, 3, 4, 6 and 7, then the storage multivibrator coupled thereto will be placed in a predetermined state of conduction to produce an output signal for meeting one of the conduction requirements of triple coincidence AND gates 33, 34, 35, 36, 37 and 38. Each of the AND gates 33–38 is also adapted to receive a series of timing pulses of convenient repetition rate generated by pulse source 51. As represented in the drawing, gate 33 is coupled to the output of multivibrator 29; gates 34 and 35 are jointly coupled to the output of multivibrator 30, and gates 36, 37 and 38 are coupled, respectively, to the outputs of multivibrators 31, 32 and 52.

In accordance with the present invention, provision is made for the sequential conduction of each of the AND gates 33–38. This is accomplished by means of a cascaded series of monostable multivibrators 39–44. In general, each monostable multivibrator is triggered into its unstable state upon the resetting of its immediately preceding monostable multivibrator; that is, multivibrators 40 and 41 are triggered upon the occurrence of the trailing edge (resetting) of the output pulse produced by multivibrator 39. Multivibrator 42 is triggered upon the occurrence of the trailing edge of the output pulse produced by multivibrator 41, and so on.

Each of the monostable multivibrators 39–44 is adapted to produce an output pulse of a predetermined duration proportional to the desired weighting of the digit associated with the AND gate to which it is coupled. The pulses passed by each of the AND gates 33–38 are applied to predetermined stages of a 3-stage decimal counter comprising 100's counter 45, 10's counter 46, and units counter 47. Each of the counters may employ magnetron beam switching tubes. The condition of the 3-stage decimal counter at any given time is displayed in terms of the value of the decimal number stored therein by means of indicators 48, 49 and 50.

To facilitate an understanding of the operation of the illustrative embodiment, it will be assumed that a sequence of eight pulses representing a binary number having the decimal value 255 is produced on input line 10 by data source 9, the pulse representing the most significant digit (having a nominal weighting factor of 128) occurring first. The first occurring pulse is passed by AND gate 1 and is applied directly by line 21 to 100's counter 45 and 10's counter 46. The application of the pulse presets counter 45 in a condition representing the value 100 and presets counter 46 into a condition representing the value 80. As previously mentioned, the illustrative embodiment is adapted to introduce a scale factor in the binary to decimal conversion process so as to produce an output indication having 360 distinguishable values in response to the input binary number having 256 distinguishable values. The scale factor is approximately 1.41.

The next occurring pulse representing the second most significant digit (having a nominal weighting factor of 64) of the input binary number is passed by gate 2 and applied to storage multivibrator 29. Similarly, the third occurring pulse of line 10 is passed by gate 3 and applied to multivibrator 30, while the subsequent pulses passed by the sequentially conducting gates 4, 6 and 7 are applied to multivibrators 31, 32 and 52, respectively. The pulses passed by gates 5 and 8, on the other hand, are not applied to any storage multivibrator; they are instead directly coupled to counters 46 and 47. The pulse passed by gate 5 is applied by unidirectional coupler 53 to the trigger input of counter 46 and by unidirectional coupler 54 to the trigger input of counter 47; the pulse passed by gate 8 is directly applied to the trigger input of counter 47. It should be noted that the pulse passed by gate 5 occurs before the pulse passed by gate 8. As a result of the direct application of the pulses by lines 21, 25 and 28 to the 3-stage decimal counter, counter 45 is placed in a condition representing the value 100, counter 46 is placed in a condition representing the value 90, and counter 47 is placed in a condition representing the value 2.

As will be seen more fully later, the pulses of lines 21, 22, 23, 24, 25, 26, 27 and 28 produce, respectively, the counts of 180, 90, 45, 23, 11, 6, 3 and 1 in the 3-stage decimal counter comprising counters 45, 46 and 47. The pulse of line 21 originally presets the counter to a value of 180; the pulse of line 25 increases the count of 80 stored in counter 46 to the count of 90 and inserts the count of unity in counter 47; the pulse of line 28 increases the count from unity to 2 in counter 47. The pulse appearing on each of the lines 22, 23, 24, 26 and 27 changes the count stored in the three bit decimal counter in yet another manner. Whereas a single pulse on each of lines 21, 25 and 28 results in the application of no more than one pulse to any of the counters 45, 46 and 47, a single pulse appearing on any of the lines 22, 23, 24, 26 and 27 results in the application of at least 3 pulses to the counter. The latter action is accomplished with the aid of the cascaded chain of monostable multivibrators 39–44 inclusive.

Monostable multivibrator 39 is triggered into its unstable condition synchronously with pulse produced by the commutator 12 on line 20. Said pulse is also applied to pulse source 51 to initiate the timing pulses produced thereby. The time constant of multivibrator 39 is adjusted so as to cause a reversion to the stable condition after a length of time sufficient to pass nine of the timing pulses of source 51 through AND gate 33. It will be recalled that gate 33 is also conditioned for conduction by the output of multivibrator 29 in the assumed case where each of the AND gates 1–8 passes a respective pulse. The 9 pulses selectively passed by AND gate 33 are applied to the triggering input of 10's counter 46 to increase the value of the count stored therein by 90.

Upon the reversion to the stable condition, the output pulse produced by multivibrator 39 terminates. The trailing edge of said output pulse jointly triggers multivibrators 40 and 41. The time constant of multivibrator 40 is adjusted to produce an output pulse having a duration sufficient to actuate gate 34 to pass four of the timing pulses produced by source 51. The time constant of multivibrator 41 is adjusted to actuate gate 35 to pass five of said timing pulses. The four pulses passed by gate 34 increase the value of the count of tens counter 46 by 40 whereas the five pulses passed by gate 35 advance the value of the count stored in units counter 47 by 5. Thus, the joint conductions of gates 34 and 35 advance the total count in the 3-stage decimal counter by a value of 45.

Upon the occurrence of a trailing edge (resetting) of the output pulse produced by multivibrator 41, multivibrator 42 is triggered into its unstable condition for a period of time to allow the passing of 23 of the timing pulses through AND gate 36. The 23 pulses advance the value of the count stored in counter 47 by 23. Similarly, the time constants of multivibrators 43 and 44 are adjusted to actuate gates 37 and 38, respectively, to advance the count of counter 47 by the values of 6 and 3. The total count resulting from the application of the assumed eight pulses via line 10 is $180+90+(40+5)+23+(10+1)+6+3+1$ or a total of 359.

It should be noted that the apparatus required for conversion is reduced to a minimum by the utilization of the pulse, if any, representing the most significant digit of the input binary representation for presetting the output decimal counter. Of course, the technique of presetting in response to the most significant digit pulse may be employed irrespective of the desired weighting factor. For example, if the pulse passed by AND gate 1 were to produce a weighted count of 128 (instead of 180 as in the embodiment of the sole figure) in the decimal counter, then said pulse would be applied to preset counter 45 to a count of 100, counter 46 to a count of 20, and counter 47 to a count of 8. Further simplification of the conversion apparatus is accomplished by the direct utilization of some of the digit pulses for increasing the count stored in the decimal counter. In the illustrative embodiment, the application of this technique is facilitated by the chosen weighting factor. That is, the pulse passed by AND gate 5 must increase the count in the decimal counter by 11, a result readily achieved by applying the single pulse passed by gate 5 directly to both the trigger inputs of counters 46 and 47.

In general, it will be required that each of the pulses passed by AND gates 1–8 increase the value of the count in the decimal counter by an amount other than that which can be achieved by mere application of the pulse to the stepping inputs of the counter. In accordance with the present invention, the digit pulses which cannot be directly applied to the decimal counter are processed by the storage multivibrators 29, 30, 31, 32 and 52, the cascaded monostable multivibrators 39–44 and the triple coincidence AND gates 33–38 to increase the decimal count value by amounts determined by the durations of the individual gating pulses produced by the monostable multivibrators. It will be seen that the increase in the decimal count produced by any one digit pulse may be readily controlled by adjusting the duration of the associated monostable multivibrator output pulse. For example, if the second least significant digit pulse passed by AND gate 7 were to increase the decimal count by 2 (instead of 3, as in the disclosed embodiment) then the gating pulse produced by monostable multivibrator 44 would be of a duration sufficient to permit the passing of two timing pulses through AND gate 38.

It should be observed that the monostable multivibrators 39–44 serve a dual function. They not only determine the durations of conduction for the AND gates 33–38 but also sequentially sample the digital data stored in the storage multivibrators 29, 30, 31, 32, and 52. Thus, the monostable multivibrators serially introduce the stored binary data into the decimal counter in bit-by-bit fashion so that the concurrence of overflow pulses between the decimal counters with the triggering pulses passed by AND gates 33–38 is avoided.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Digital data conversion apparatus adapted to respond to input signals, each signal representing the value unit of a respective digit of a binary numerical expression, said apparatus comprising a source of clock pulses, a plurality of multiple input coincidence gates connected to receive said clock pulses, each gate being coupled to respond to a respective one of said signals, means for producing a succession of gating pulses, each said gating pulse having a predetermined duration proportional to the desired weighting value of a respective digit of said binary numerical expression, each said gating pulse being applied to a respective one of said gates whereby each gate responding to one of said signals is rendered conductive for the duration of its respectively applied gating pulse to pass a predetermined number of said clock pulses proportional to the desired weighting value associated with said respectively applied gating pulse, and pulse accumulating means coupled to receive the clock pulses passed by said gating means.

2. Digital data conversion apparatus adapted to respond to input signals, each signal representing the value unity of a respective digit of a binary numerical expression, said apparatus comprising a source of clock pulses, a plurality of multiple input coincidence gates connected to receive said clock pulses, each gate being coupled to respond to a respective one of said signals, a plurality of monostable multivibrators connected in cascade for producing a succession of gating pulses, each said gating pulse having a predetermined duration proportional to the desired weighting value of a respective digit of said binary numerical expression, each said gating pulse being applied to a respective one of said gates whereby each gate responding to one of said signals is rendered conductive for the duration of its respectively applied gating pulse to pass a predetermined number of said clock pulses proportional to the desired weighting value associated with said respectively applied gating pulse, and pulse counting means coupled to receive the clock pulses passed by said gating means.
means coupled to receive the clock pulses passed by said

3. Digital data conversion apparatus adapted to respond to pulsed input signals, each signal representing the value unity of a respective digit of a binary numerical expression, said apparatus comprising, a plurality of pulse storage means each being coupled to receive a respective one of said signals to produce an output signal in response thereto, a source of clock pulses, a plurality of multiple input coincidence gates connected to receive said clock pulses, each gate being coupled to receive the output signal from a respective one of said storage means, means for producing a succession of gating pulses, each said gating pulse having a predetermined duration proportional to the desired weighting value of a respective digit of said binary numerical expression, each said gating pulse being applied to a respective one of said gates whereby each gate receiving a respective output signal is rendered conductive for the duration of its respectively applied gating pulse to pass a predetermined number of said clock pulses proportional to the desired weighting value associated with said respectively applied gating pulse, and pulse accumulating means coupled to receive the clock pulses passed by said gating means.

4. Digital data conversion apparatus adapted to respond to pulsed input signals, each signal representing the value unity of a respective digit of a binary numerical expression, said apparatus comprising, a plurality of pulse storage means each being coupled to receive a respective one of said signals to produce an output signal in response thereto, a source of clock pulses, a plurality of multiple input coincidence gates connected to receive said clock pulses, each gate being coupled to receive the output signal from a respective one of said storage means, a plurality of monostable multivibrators connected in cascade for producing a succession of gating pulses, each said gating pulse having a predetermined duration proportional to the desired weighting value of a respective digit of said binary numerical expression, each said gating pulse being applied to a respective one of said gates whereby each gate receiving a respective output signal is rendered conductive for the duration of its respectively applied gating pulse to pass a predetermined number of said clock pulses proportional to the desired weighting value associated with said respectively applied gating pulse, and pulse counting gating means.

5. Digital data conversion apparatus adapted to respond to a series of pulsed input signals, each signal representing the value unity of a respective digit of a binary numerical expression, the signal representing the most significant digit occurring first, said apparatus comprising a plurality of pulse storage means each being coupled to receive a respective one of said signals other than the signal representing the most significant digit of said binary numerical expression and being operative to produce an output signal in response thereto, a source of clock pulses, a plurality of multiple input coincidence gates connected to receive said clock pulses, each gate being coupled to receive the output signal from a respective one of said storage means, means for producing a succession of gating pulses, each said gating pulse having a predetermined duration proportional to the desired weighting value of a respective digit of said binary numerical expression, each said gating pulse being applied to a respective one of said gates whereby each gate receiving a respective output signal is rendered conductive for the duration of its respectively applied gating pulse to pass a predetermined number of said clock pulses proportional to the desired weighting value associated with said respectively applied gating pulse, pulse accumulating means coupled to receive the clock pulses passed by said gates, and means for applying the input signal representing said most significant digit to said accumulating means for presetting the condition thereof.

6. Digital data conversion apparatus adapted to respond to a series of pulsed input signals, each signal representing the value unity of a respective digit of a binary numerical expression, the signal representing the most significant digit occurring first, said apparatus comprising a plurality of pulse storage means, each being coupled to receive a respective one of said signals other than the signal representing the most significant digit of said binary numerical expression and being operative to produce an output signal in response thereto, a source of clock pulses, a plurality of multiple input coincidence gates connected to receive said clock pulses, each gate being coupled to receive the output signal from a respective one of said storage means, means for producing a succession of gating pulses, each said gating pulse having a predetermined duration proportional to the desired weighting value of a respective digit of said binary numerical expression, each said gating pulse being applied to a respective one of said gates whereby each gate receiving a respective output signal is rendered conductive for the duration of its respectively applied gating pulse to pass a predetermined number of said clock pulses proportional to the desired weighting value associated with said respectively applied gating pulse, pulse counting means coupled to receive the clock pulses passed by said gates, and means for applying the input signal representing said most significant digit to other than the least significant digit place of said counting means for presetting the count therein to a predetermined value.

7. Digital data conversion apparatus adapted to respond to a series of pulsed input signals, each signal representing the value unity of a respective digit of a binary numerical expression, the signal representing the most significant digit occurring first and the signal representing the least significant digit occurring last, said apparatus comprising a plurality of pulse storage means each being coupled to receive a respective one of said signals other than the signals representing the most and the least significant digits of said binary numerical expression and being operative to produce an output signal in response thereto, a source of clock pulses, a plurality of multiple input coincidence gates connected to receive said clock pulses, each gate being coupled to receive the output signal from a respective one of said storage means, means for producing a succession of gating pulses, each said gating pulse having a predetermined duration proportional to the desired weighting value of a respective digit of said binary numerical expression, each said gating pulse being applied to a respective one of said gates whereby each gate receiving a respective output signal is rendered conductive for the duration of its respectively applied gating pulse to pass a predetermined number of said clock pulses proportional to the desired weighting value associated with said respectively applied gating pulse, pulse counting means coupled to receive the clock pulses passed by said gates, means for applying the input signal representing said most significant digit to other than the least significant digit place of said counting means for presetting the count therein to a predetermined value, and means for applying the input signal representing said least significant digit to said counting means for increasing the count therein.

References Cited by the Examiner

UNITED STATES PATENTS

| | | | |
|---|---|---|---|
| 2,933,625 | 4/60 | Townsend et al. ------ | 307—88.5 |
| 2,979,709 | 4/61 | David et al. ---------- | 340—347 |

MALCOLM A. MORRISON, *Primary Examiner.*